J. E. BINGHAM.
Handle for Tea and Coffee Pots.

No. 211,692.   Patented Jan. 28, 1879.

Attest:
Geo. T. Smallwood Jr.
Walter Allen

Inventor:
John Edward Bingham
By Forbes & Page
attys.

UNITED STATES PATENT OFFICE.

JOHN E. BINGHAM, OF SHEFFIELD, ENGLAND.

IMPROVEMENT IN HANDLES FOR TEA AND COFFEE POTS.

Specification forming part of Letters Patent No. 211,692, dated January 28, 1879; application filed November 19, 1878.

*To all whom it may concern:*

Be it known that I, JOHN EDWARD BINGHAM, of Sheffield, in the county of York, England, have invented a new and useful Improvement in Handles for Tea and Coffee Pots, and similar vessels, of which the following is a specification:

This invention relates to those metallic handles for tea and coffee pots, and similar vessels, which are constructed of curved or bowed shape, and attached to the side of the vessel by both extremities. The same are commonly made hollow or tubular for lightness, and two modes of keeping them relatively cool have been proposed.

One of these modes consists in providing the handle with perforations in longitudinal series to admit air to the interior of the gripe, and the other consists in interposing a non-conducting disk between each end of the handle and the side of the vessel. The latter is the most effective, but is quite expensive.

The other mode has been ineffective, owing, as I have discovered, to the arrangement of the perforations on a wrong principle, the sole reliance having been upon the inadequate cooling effect of the air on the heated gripe, while the perforations in the latter render it uncomfortable to the hand.

My invention consists in a hollow handle of the class above named, having a smooth imperforate gripe, which is isolated to a sufficient extent from the hot vessel by latitudinal rows of perforations surrounding the respective ends of the handle. Said perforations serve, secondarily, to induce a flow of air through the hollow gripe; but their principal effect is the isolation of the gripe, as aforesaid, which is accomplished by conducting a stratum of air across each end of the handle, and by the reduction of the area of heat-conducting metal between the hot vessel and the gripe, as hereinafter more fully set forth.

Figure 1:
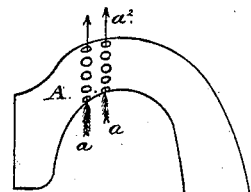
Figure 2:
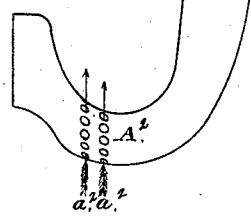
Figure 2:
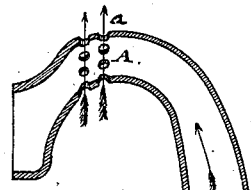

Figure 1 of the accompanying drawings represents a side view, and Fig. 2 a longitudinal section, of a handle illustrating this invention.

A $A^2$ in each figure represent the perforations, and B the hollow imperforate gripe, the former being arranged at the extremities of the latter in latitudinal rows extending around the ends of the handle.

The arrows $a$ $a^2$ represent the flow of air through the respective series of perforations, by which the passage of heat from the hot vessel to the gripe of the handle is intercepted. Said perforations A $A^2$ thus operate to isolate the gripe B by interposing a stratum of air between each end of the same and the vessel; and this effect is aided by the reduction of the area of heat-conducting metal between the vessel and the gripe, which is accomplished in making the perforations.

The arrows $b$ indicate the flow of a cooling current of air through the imperforate gripe longitudinally, the air being admitted by the perforations $A^2$, and escaping at the perforations A. This operation will ensue if the gripe becomes at all heated, owing to the well-known law of circulation; but by the interception of heat, as aforesaid, the perforations operate primarily to prevent or materially retard the heating of the gripe of the handle, and the arrangement of the perforations by which this is accomplished is an essential feature of my invention.

The improved handle is adapted to be cheaply manufactured, of light weight, out of either sheet metal or cast metal, and to be attached in the most simple manner by rivets and solder, either or both.

The following is what I claim as new and of my own invention, and desire to secure by Letters Patent of the United States, namely:

The improved metallic handle herein specified, constructed with an imperforate hollow gripe, and latitudinal rows of perforations surrounding the respective ends of the handle, the latter operating to isolate said gripe, and to induce a flow of air therethrough, in the manner and for the purpose set forth.

JOHN EDWARD BINGHAM.

Witnesses:
 W. CORKER,
 ROBT. F. DRURY.